(No Model.)
C. W. SMITH.
HAND TRUCK.
No. 342,978. Patented June 1, 1886.
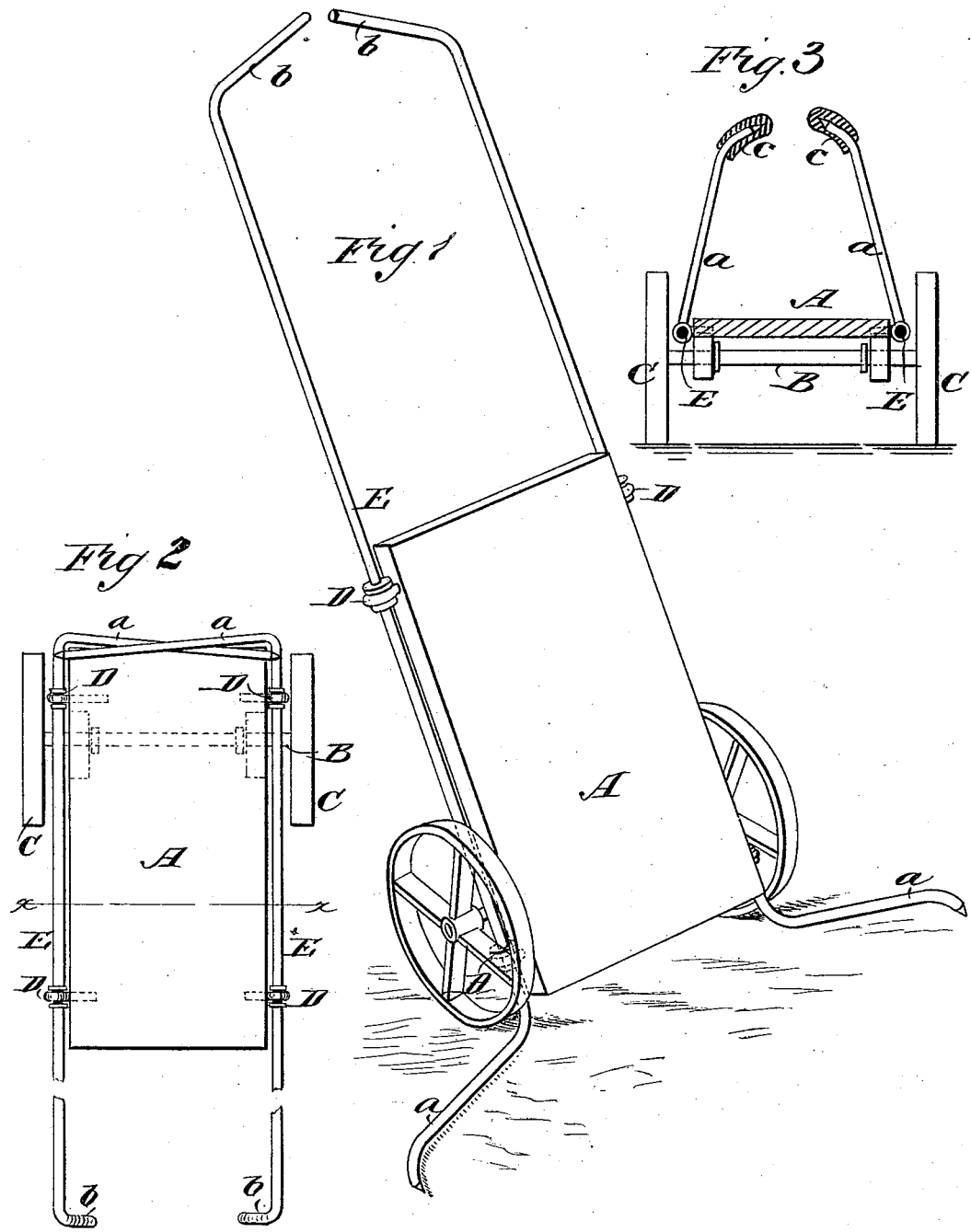
WITNESSES:
F. McArdle
C. Sedgwick
INVENTOR:
C. W. Smith
BY Munn & Co.
ATTORNEYS.

UNITED STATES PATENT OFFICE.

CHARLES WEED SMITH, OF BELMOND, IOWA.

HAND-TRUCK.

SPECIFICATION forming part of Letters Patent No. 342,978, dated June 1, 1886.

Application filed February 10, 1886. Serial No. 191,497. (No model.)

*To all whom it may concern:*

Be it known that I, CHARLES WEED SMITH, of Belmond, in the county of Wright and State of Iowa, have invented a new and useful Improvement in Hand-Trucks, of which the following is a specification, reference being had to the annexed drawings, forming a part thereof, in which—

Figure 1 is a perspective view. Fig. 2 is a plan view. Fig. 3 is a transverse section taken on line $x\ x$ in Fig. 2, looking toward the wheels of the truck.

Similar letters of reference indicate corresponding parts in the different figures of the drawings.

The object of my invention is to provide a hand-truck with a convenient and effective device for grasping the load to be picked up and carried by the truck.

My invention consists in the combination, with a truck-platform supported on wheels, of rods turning in bearings at the edges of the platform, and provided with arms at the lower end of the platform for engaging the article to be carried by the truck, and having the opposite ends bent to form levers for turning the rods and bringing the arms into engagement with the load.

The platform A of the truck is mounted upon the axle B, having on opposite ends wheels C, of the usual description. In eyes D, secured to the edges of the platform A, are journaled rods E, which extend beyond the lower end of the platform, and are bent approximately at right angles to form arms $a$, and the ends of the arms are bent inward slightly and pointed to facilitate their engagement with the articles forming the load of the truck. The opposite ends of the rods E are bent toward each other at right angles, forming arms $b$, which serve as levers for turning the rods E and the arms $a$, and also as handles to the truck. The rods E are provided with collars above and below the eyes D, to prevent end motion of the rods. The arms $a\ b$ of each rod E are bent in planes approximately at right angles with each other, and the arms $a$ are bent inward slightly toward the platform of the truck, to permit of their folding one over the other upon the lower edge of the platform, as shown in Fig. 2, to admit of using the truck, when desirable, without employing the arms $a$.

To take up the article forming the load for the truck, the platform of the truck is moved forward in contact with the article, when the rods E are turned upon their journals by means of the arms $b$, bringing the arms $a$ into engagement with the sides of the article, when the platform of the truck will be tilted on its axle, lifting the load from the ground or floor, which will then be supported by the platform A and the arms $a$.

When the article to be carried by the truck is of such a nature as to be liable to injury by the points of the arms $a$, caps $c$, of rubber or other yielding material, are placed over the points, as shown in Fig. 3.

Having thus described my invention, what I claim as new, and desire to secure by Letters Patent, is—

1. The combination, with the truck-body A, of rods E, journaled at the sides thereof and bent at their upper and lower ends to form arms $b\ a$, substantially as herein shown and described.

2. The combination, with the truck-body A, of rods E, journaled at the sides of the truck, provided with pointed and curved arms $a$ at the lower end, and having arms $b$ at their upper ends, substantially as herein shown and described.

3. The combination, with the truck-body A, of rods E, journaled at the sides thereof, and provided at their lower ends with arms $a$, bent inward so as to overlap each other, when folded, and having at their upper ends arms $b$, serving as handles to the truck, and as levers for operating the arms $a$, substantially as herein shown and described.

4. The combination, with the truck-body A, of rods E, having arms $b\ a$, formed upon the upper and lower ends thereof, and the yielding caps $c$, received upon the ends of the arms $a$, substantially as herein shown and described.

CHAS. WEED SMITH.

Witnesses:
DAVID L. CAPPETT,
E. L. HUBBURD.